United States Patent [19]

Rim

[11] Patent Number: 5,920,497
[45] Date of Patent: Jul. 6, 1999

[54] METHOD AND APPARATUS FOR PERFORMING A DOUBLE PRECISION OPERATION USING A SINGLE INSTRUCTION TYPE

[75] Inventor: Min-Joong Rim, Kyungki-do, Rep. of Korea

[73] Assignee: Samsung Electronics, Co., Ltd., Suwon, Rep. of Korea

[21] Appl. No.: 08/926,949

[22] Filed: Sep. 10, 1997

[30] Foreign Application Priority Data

Dec. 24, 1996 [KR] Rep. of Korea ............... 96-71765

[51] Int. Cl.[6] ........................................ G06F 7/52
[52] U.S. Cl. .................. 364/754.01; 364/757; 364/759
[58] Field of Search .................... 364/748.09, 754.01, 364/757, 758, 759, 760.01, 760.05

[56] References Cited

U.S. PATENT DOCUMENTS

| | | | |
|---|---|---|---|
| 4,135,249 | 1/1979 | Irwin | 364/758 |
| 4,722,068 | 1/1988 | Kuroda et al. | 364/757 |
| 4,809,212 | 2/1989 | New et al. | 364/757 |
| 4,811,268 | 3/1989 | Nishitani et al. | 364/745 |
| 5,457,804 | 10/1995 | Ohtomo | 395/800 |
| 5,463,575 | 10/1995 | White | 364/754 |

*Primary Examiner*—Ohuong Dinh Ngo
*Attorney, Agent, or Firm*—Marger Johnson & McCollom, P.C.

[57] ABSTRACT

The present invention relates to a method and apparatus for performing double precision operations using a single type of instruction, wherein a shift bit in a status register is cleared responsive to an operation between signed and signed operands or between unsigned and unsigned operands and the shift bit is cleared responsive to an operation between signed and unsigned operands or unsigned and signed operands. An accumulated result is shifted to the right when the shift bit changes state in order to accomplish a shift and a multiplication to be performed simultaneously responsive to a single type of instruction.

6 Claims, 1 Drawing Sheet

METHOD AND APPARATUS FOR PERFORMING A DOUBLE PRECISION OPERATION USING A SINGLE INSTRUCTION TYPE

BACKGROUND OF THE INVENTION

1. Field of the Invention

The present invention relates to an apparatus and method for performing a double precision double precision operation involving signed and unsigned operators during four instruction cycles using a shift bit in a status register.

2. Description of the Prior Art

Double precision operations in conventional DSPs are typically accomplished using two registers as a single word (i.e. two 16-bit registers to form one 32-bit word) and are executed using an instruction having, for instance, two address regions where one address region relates to a primitive operand and the other address region relates to an object operand.

A typical example of a double precision operation in a conventional 16-bit fixed-point DSP is as follows. Assuming that four 16-bit registers L1, L0, R0 and R1 exist, six operational steps are performed in order to execute a double precision multiplication of (L1:L0)×(R1:R0), where a left signed operand (L1:L0) and a right signed operand (R1:R0) are each expressed in 32 bits. The first step is to perform a multiplication and accumulation (MAC) operation of unsigned operands of L0×R0. The second step involves shifting the accumulated result of the first MAC operation sixteen bit positions to the right. The third step is to perform a MAC operation of signed operand L1 and unsigned operand R0 (i.e. L1×R0). The fourth step is a MAC operation of unsigned operand L0 and signed operand R1 (i.e. L0×R1). The fifth step is the shifting of the accumulated result sixteen bits to the right. Finally, the sixth step is a MAC operation of signed operands L1 and R1 (i.e. L1×R1).

Further, given that the DSP has one multiplication and accumulation unit, for performing the MAC operation, and one barrel shifter, for performing the shifting operation, then, in the double precision operation described above, the shifting operation of the second step and the MAC operation of the third step can be performed simultaneously and the shifting operation of the fifth step and the MAC operation of the sixth step can be performed simultaneously. By performing steps simultaneously, the double precision operation can be executed in as few as four operational cycles. However, conventional DSPs typically load two data operands during a MAC operation so that when the instruction fields designating two operand registers and one object register are combined, then most of the sixteen bits constituting the MAC instruction will be occupied.

Accordingly, it has been a problem in conventional DSPs that many types of MAC instructions cannot be executed in four instruction cycles because a complex instruction permitting simultaneous operations cannot be formed and, therefore, a double precision multiplication operation cannot be performed within four operational cycles.

SUMMARY OF THE INVENTION

It is an object of the present invention to provide for a double precision method and apparatus which is capable of performing a double precision operation in four periods by assigning a bit in a status register designating a positional shift of an accumulator and then performing multiplication of both signed and unsigned operands based upon the value of the status register in response to a single type of multiplication instruction.

An embodiment of the method for performing double precision operations according to the present invention includes initializing a position shift bit in a status register to a cleared state, clearing the position shift bit responsive to any one of an operation between a first signed operand and a second signed operand and an operation between a first unsigned operand and a second unsigned operand, setting the position shift bit responsive to any one of an operation between the first signed operand and the second unsigned operand and an operation between the first unsigned operand and the second signed operand, and shifting an accumulator responsive to a change in state of the position shift bit.

An embodiment of an apparatus for performing double precision operations according to the present invention includes a status register having a shift bit that is cleared responsive to either an operation between a first signed operand and a second signed operand or an operation between a first unsigned operand and a second unsigned operand, and where the shift bit is set responsive to either an operation between the first signed operand and the second unsigned operand or an operation between the first unsigned operand and the second signed operand. The apparatus also includes a multiplier that receives a first input operand and a second input operand, multiplies the first and second multiplier input operands, and generates a product of the first and second multiplier input operands. An ALU in the apparatus adds the output of a shifter to the output of the multiplier and outputs the result to an accumulator. The shifter is configured to shift receive the value stored in the accumulator and shift the value responsive to a change of state of the shift bit.

In order to attain the foregoing objects, the present method and apparatus for double precision operation uses a single type of MAC instruction and performs double precision multiplication of signed and unsigned operators according to the bit value of a status register by assigning a bit in the status register designating a positional shift of an accumulator.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENT

Figure 1:
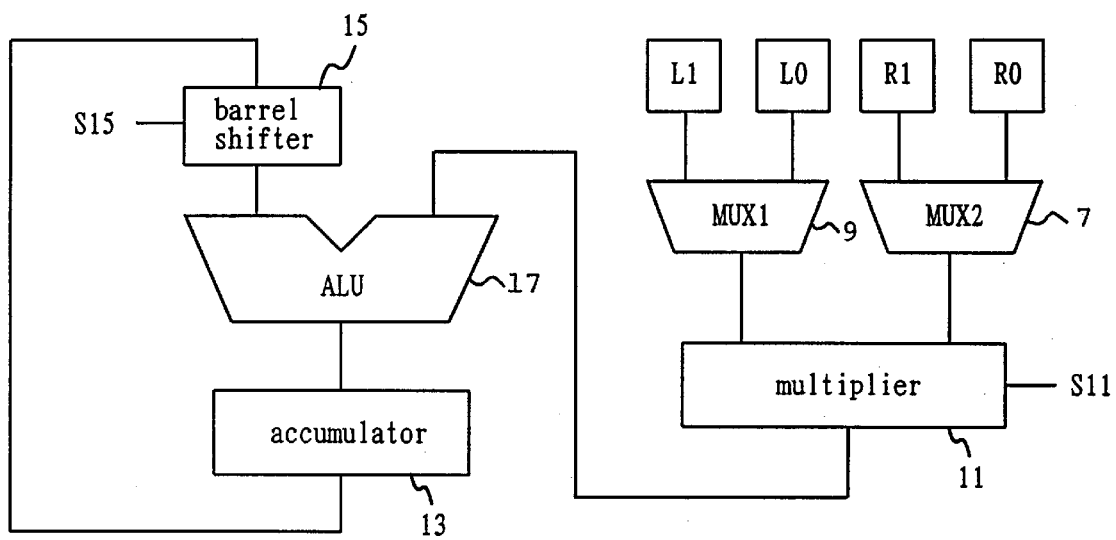
FIG. 1 is a block diagram of an embodiment of a double precision multiplier according to the present invention.

FIG. 1 is a block diagram of a double precision multiplier circuit in a DSP. The circuit consists of multiplexors MUX1 and MUX2 which select operands from 16-bit registers R0, R1, L0, and L1 as operators for a double precision multiplication operation. A multiplier 11 performs a multiplying operation by using a value from each of MUX1 and MUX2 as an operator. A barrel shifter 15 performs a double precision shift operation and outputs the shift result to an arithmetic logic unit (ALU) 17 which adds the output of the barrel shifter 15 and the multiplier 11. An accumulator 13 accumulates the output of the ALU 17. The double precision multiplier unit 100 of the present invention shifts the result in the accumulator 13 by 16-bits to the right using barrel shifter 15 and simultaneously adds the output of barrel shifter 15 and the output of multiplier 11 in ALU 17.

Figure 2:
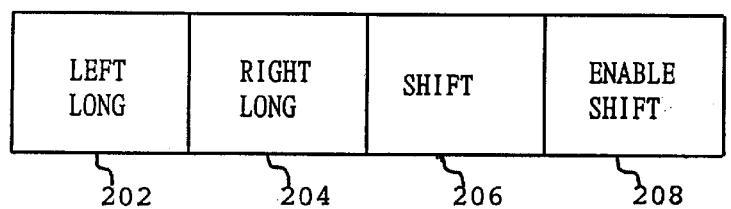
FIG. 2 illustrates a bit allocation in an embodiment of a status register according to the present invention.

However, when the same type of MAC instruction is used to execute each multiplication step in the complete double precision multiplication process of double precision multiplier unit 100, it is important to determine when the result residing in accumulator 13 must be shifted or not. A status register 200 is provided which includes a "SHIFTED" bit 206 that is initially set to "0" and which is used to determine when the value in accumulator 13 is to be shifted by 16-bits. The status register 200, as shown in FIG. 2, also includes status bits "LEFT LONG" 202, "RIGHT LONG" 204 and "ENABLE SHIFT" 208.

First of all, a multiplication of signed and unsigned operators using one instruction type can be solved by assigning a bit designating double precision to the status register, as is done in the method used in the D950 core of SGS-Thomson.

In the case where both the left operator (L1:L0) and right operator (R1:R0) are each set up as double precision operands, the multiplier 11 performs four MAC operations: a multiplication of unsigned operands L0 and R0, a multiplication of signed operand R1 and unsigned operand L0, a multiplication of unsigned operand R0 and signed operand L1, and a multiplication of signed operands L1 and R1.

When the multiplier 11 performs the multiplication of unsigned operands L0×R0, the "SHIFFED" bit of the status register is unchanged and remains "0" since the accumulator is in a normal unshifted state.

Next, when the multiplier 11 performs a multiplication of signed and unsigned operands, such as L1×R0 or L0×R1, the circuit as shown in FIG. 1 changes the "SHIFTED" bit of the status register to "1" and, responsive to the change of the state of the "SHIFTED" bit, the result accumulated in accumulator 13 is shifted sixteen bit positions to the right. The signed and unsigned multiplication is performed by multiplier 11 simultaneously to the shift of accumulator 13.

The next multiplication step involves another signed and unsigned multiplication, i.e. if L1×R0 was performed in the previous step then L0×R1 is performed and if L0×R1 was performed in the previous step then L1×R0 is performed. Performing another signed and unsigned multiplication will cause the circuit 100 to attempt to set the value of the "SHIFTED" bit to a "1". However, the "SHIFTED" bit is already set to a "1" value and no change of state takes place. As a result, no shift of accumulator 13 takes place and the multiplier 11 performs the L1×R0 or L0×R1 operation.

In the final step, a signed and signed multiplication, L1×R1, is performed by multiplier 11 and the "SHIFTED" bit is reset to "0" which represent a state change for the "SHIFTED" bit. In response to the state change, the circuit performs a MAC operation which includes multiplying L1 and R1 in multiplier 11 at the same time as the value in the accumulator 13 is shifted sixteen bit positions to the right.

In other words, the "SHIFFED" bit is reset to "0" in response to a signed and signed or unsigned and unsigned multiplication, i.e. the multiplier 11 performs the operation of L0×R0 and L1×R1, and the "SHIFTED" bit is set to "1" in response to a signed and unsigned or unsigned and signed multiplication, i.e. the multiplier 11 performs the operation of L1×R0 or L0×R1. When the "SHIFTED" bit changes state, either from a "0" to a "1" or a "1" to a "0", then the circuit performs the MAC operation which includes a shift of the output value in the accumulator by 16-bits in addition to multiplying the operands in multiplier 11.

The method and apparatus described above performs a double precision multiplication involving both signed and unsigned operators using a single type of multiplication instruction by assigning a bit in a status register which determines when the output value of the accumulator is shifted by 16-bits from the unshifted state. The present invention can simultaneously perform MAC and positional shift operations using the bit in the status register and the type of operands included in the instruction to control when a positional shift is to be performed simultaneous to a multiplication operation. Therefore, the present invention can perform double precision multiplication using a single status bit and a single type of MAC instruction to perform all the multiplication steps necessary for the double precision multiplication.

When the shift control mechanism of the present invention is not necessary, the "ENABLE SHIFTED" bit in the status register 200 can be assigned and set to disable the "SHIFTED" bit.

Although a specific embodiment has been described in the drawings and specification, it is used in a generic and descriptive sense only and not for purposes of limitation. The scope of the invention is set forth in the following claims.

What is claimed is:

1. A method for double precision multiplication, the method including the steps:

initializing a position shift bit in a status register to a cleared state;

clearing the position shift bit responsive to any one of an operation between a first signed operand and a second signed operand and an operation between a first unsigned operand and a second unsigned operand;

setting the position shift bit responsive to any one of an operation between the first signed operand and the second unsigned operand and an operation between the first unsigned operand and the second signed operand; and shifting an accumulator responsive to a change in state of the position shift bit.

2. The method of claim 1, wherein each one of the operation between a first signed operand and a second signed operand, the operation between a first unsigned operand and a second unsigned operand, the operation between the first signed operand and the second unsigned operand, and the operation between the first unsigned operand and the second signed operand are performed responsive to a single type of instruction.

3. The method of claim 1, including the steps of:

setting a shift inhibit bit in the status register; and inhibiting the shifting of the accumulator responsive to the shift inhibit bit being set.

4. An apparatus for performing double precision operations, the apparatus comprising:

a status register including a shift bit, wherein the shift bit is configured to be cleared responsive to either one of an operation between a first signed operand and a second signed operand and an operation between a first unsigned operand and a second unsigned operand, and wherein the shift bit is configured to be set responsive to either one of an operation between the first signed operand and the second unsigned operand and an operation between the first unsigned operand and the second signed operand;

a multiplier having first and second input terminals and an output terminal, wherein the multiplier is configured to receive a first input operand at the first input terminal of the multiplier and receive a second input operand at the second input terminal of the multiplier, multiply first and second multiplier input operands, and generate a product at the output terminal of the multiplier;

an ALU having first and second input terminals and an output terminal, wherein the first input terminal of the ALU is coupled to the output terminal of the multiplier;

an accumulator having an input terminal and an output terminal, wherein the input terminal of the accumulator is coupled to the output terminal of the ALU;

a shifter having an input terminal and an output terminal, wherein the input terminal of the shifter is coupled to the output terminal of the accumulator and the output terminal of the shifter is coupled to the second input terminal of the ALU, and further wherein the shifter is configured to shift a value received from the accumulator responsive to a change of state of the shift bit.

5. The apparatus of claim 4 wherein the operation between a first signed operand and a second signed operand, the operation between a first unsigned operand and a second unsigned operand, the operation between the first signed operand and the second unsigned operand and the operation between the first unsigned operand and the second signed operand are performed responsive to a single type of instruction.

6. The apparatus of claim 5 further comprising:

a first multiplexor having first and second input terminals and an output terminal, wherein the first input terminal of the first multiplexor is configured to receive the first signed operand and the second input terminal of the first multiplexor is configured to receive the first unsigned operand, and wherein the output terminal of the first multiplexor is coupled to the first input terminal of the multiplier; and a second multiplexor having first and second input terminals and an output terminal, wherein the first input terminal of the second multiplexor is configured to receive the second signed operand and the second input terminal of the second multiplexor is configured to receive the second unsigned operand, and wherein the output terminal of the second multiplexor is coupled to the second input terminal of the multiplier.

* * * * *